United States Patent [19]

VandenBrink

[11] Patent Number: 5,176,209
[45] Date of Patent: Jan. 5, 1993

[54] CULTIVATOR SWEEP

[76] Inventor: Mark VandenBrink, R.R. #2, Box 129, Sullivan, Ill. 61951

[21] Appl. No.: 808,597

[22] Filed: Dec. 17, 1991

[51] Int. Cl.$^5$ ................. A01B 15/00; A01B 35/20
[52] U.S. Cl. ............................... 172/770; 172/765; 172/730
[58] Field of Search ........... 172/765, 766, 770, 771, 172/378, 380, 379, 381, 721, 730, 155, 159

[56] References Cited

U.S. PATENT DOCUMENTS

| 404,156 | 5/1889 | Bill | 172/380 |
|---|---|---|---|
| 956,768 | 5/1910 | Jauer | 172/765 |
| 1,000,473 | 8/1911 | Wilson | 172/371 |
| 1,648,843 | 11/1927 | Francis | 172/730 |
| 1,946,006 | 2/1934 | Struckmeyer | 172/381 |
| 1,954,250 | 4/1934 | Lee | 172/381 |
| 2,184,968 | 12/1939 | Woodruff | 172/380 |
| 2,351,388 | 6/1944 | Baxter | 172/720 |
| 2,704,499 | 3/1955 | Radway | 172/720 |
| 3,015,930 | 1/1962 | Campbell | 172/380 |
| 3,152,649 | 10/1964 | Arnold . | |
| 4,047,577 | 9/1977 | Tibbs, II . | |
| 4,583,599 | 4/1986 | Anderson | 172/771 |
| 4,850,435 | 7/1989 | Morris et al. | 172/770 |

FOREIGN PATENT DOCUMENTS 577080 5/1933 Fed. Rep. of Germany ...... 172/380
941031 3/1956 Fed. Rep. of Germany ...... 172/380

OTHER PUBLICATIONS

International Harvester, 133 Series, Vibra-Tine Owner's Manual, Oct. 1976, pp. 1, 2, 3, 24-29.
Farm Show Flyer, "Add on Wings for Chisel Plow Sweeps", May 1985, vol. 9, No. 3.
*Convenient Crop Care*, John Deere (pp. 13, 17 and 22), Mar. 1990.

Primary Examiner—Dennis L. Taylor
Assistant Examiner—Spencer Warnick
Attorney, Agent, or Firm—Welsh & Katz, Ltd.

[57] ABSTRACT

A cultivator sweep or shovel includes a rigid generally arrowhead shaped body having a central mounting flange enabling attachment to a support shank or tine. The sweep has rearwardly diverging primary cutting edges and one or more outwardly and forwardly projecting weed cutting points formed along the primary cutting edges to capture and sever weeds in the path of the sweep so as to prevent weeds from slipping past the sweep.

12 Claims, 2 Drawing Sheets

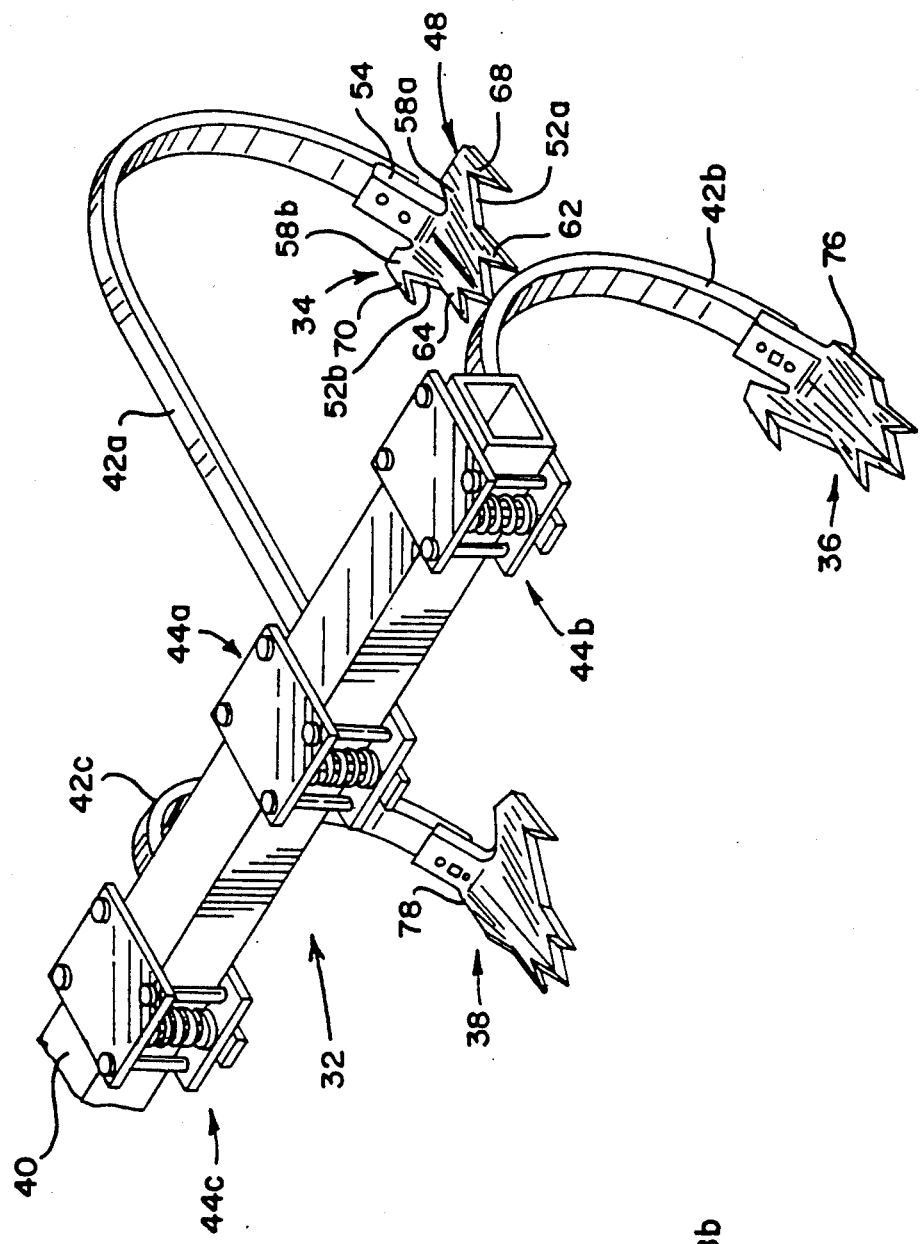
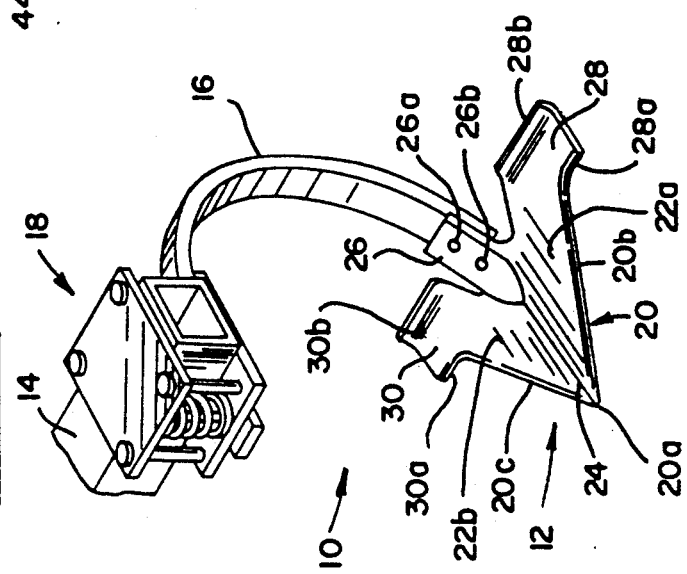

CULTIVATOR SWEEP

BACKGROUND OF THE INVENTION

The present invention relates generally to cultivator sweeps, and more particularly to a novel cultivator sweep or shovel having one or more generally forwardly projecting weed cutting points which prevent weeds in the path of the sweep from slipping past the sweep without being severed.

Cultivating has long been an effective and efficient method for killing weeds during crop growth. Soil or ground working cultivators generally employ one or more shanks or tines supported in depending relation from a frame adapted for attachment to the rear of a tractor or the like. The shanks have sweeps attached to lower free ends such that the sweeps penetrate and break up the soil when drawn in a forward direction. A conventional cultivator sweep takes the form of an arrowhead shaped body having an upwardly and rearwardly inclined flange or tongue centrally of the sweep to facilitate attachment to a shank. The sweep body has a convex upper surface and rearwardly diverging edges which are preferably sharpened and lie in a generally horizontal plane during soil working. As the sweep is drawn through the soil, it breaks up the hardened soil with an upward heaving action, and the sharpened diverging edges are also intended to cut weeds and other undesirable growth in the path of the sweep.

A significant problem with conventional sweeps is that weeds may slip past the cutting edges of the sweep without being severed. Attempts have been made to overcome this problem by forming generally right-angle wings on conventional arrowhead shaped sweeps. See, for example, U.S. Pat. Nos. 1,648,843 and 4,583,599. A drawback in the sweeps disclosed in these patents is that the wing portions add significantly to the force required to pull or draw the sweeps through the soil, and do not fully assure that weed stalks will be severed. The present invention provides a novel sweep or shovel which, in its various embodiments, effects more efficient cutting of weeds in the path of the sweep with minimal increase in force required to draw the sweep through the soil.

SUMMARY OF THE INVENTION

A general object of the present invention is to provide a novel cultivator sweep or shovel which effects improved cutting of weeds in the path of the sweep during soil working.

A more particular object of the present invention is to provide a novel cultivator sweep comprising a generally arrowhead shaped body having rearwardly diverging primary cutting edges with one or more pointed projections or cutting points extending outwardly and forwardly from the diverging primary cutting edges to positively capture and sever weeds which tend to slide past the primary cutting edges.

A feature of the sweep in accordance with the invention lies in forming the forwardly extending pointed weed severing projections so that they are substantially coplanar with the corresponding body portions of the sweep, thereby improving both breakup of soil and weed severing without significantly increasing the force required to pull the sweep through the soil.

Another feature of the cultivator sweep or shovel in accordance with the present invention lies in adapting the weed severing projections or cutting points to various sweep configurations when employing a plurality of cultivator sweeps supported on a cultivator support frame.

In carrying out the present invention, a sweep is provided comprising a rigid generally arrowhead shaped body having a central mounting flange enabling attachment to a cultivator frame through a support shank or tine. The sweep has rearwardly diverging primary cutting edges formed at the lateral edges of an upwardly convex sweep body. One or more forwardly extending pointed weed severing projections or cutting points are formed along the primary cutting edges of the sweep and are operative to capture and sever weed stalks in the path of the sweep during cultivation. The pointed weed severing projections are preferably substantially coplanar with the corresponding upper convex surface of the sweep.

Further objects, features and advantages of the present invention will become apparent from the following detailed description taken with the accompanying drawings wherein like reference number designate like elements throughout the several views.

BRIEF DESCRIPTION OF THE DRAWINGS

FIG. 1 is a fragmentary perspective view of a cultivator having a sweep constructed in accordance with the prior art;

FIG. 2 is a fragmentary perspective view of a cultivator having three sweeps mounted thereon in accordance with the present invention;

DETAILED DESCRIPTION

Figure 3:
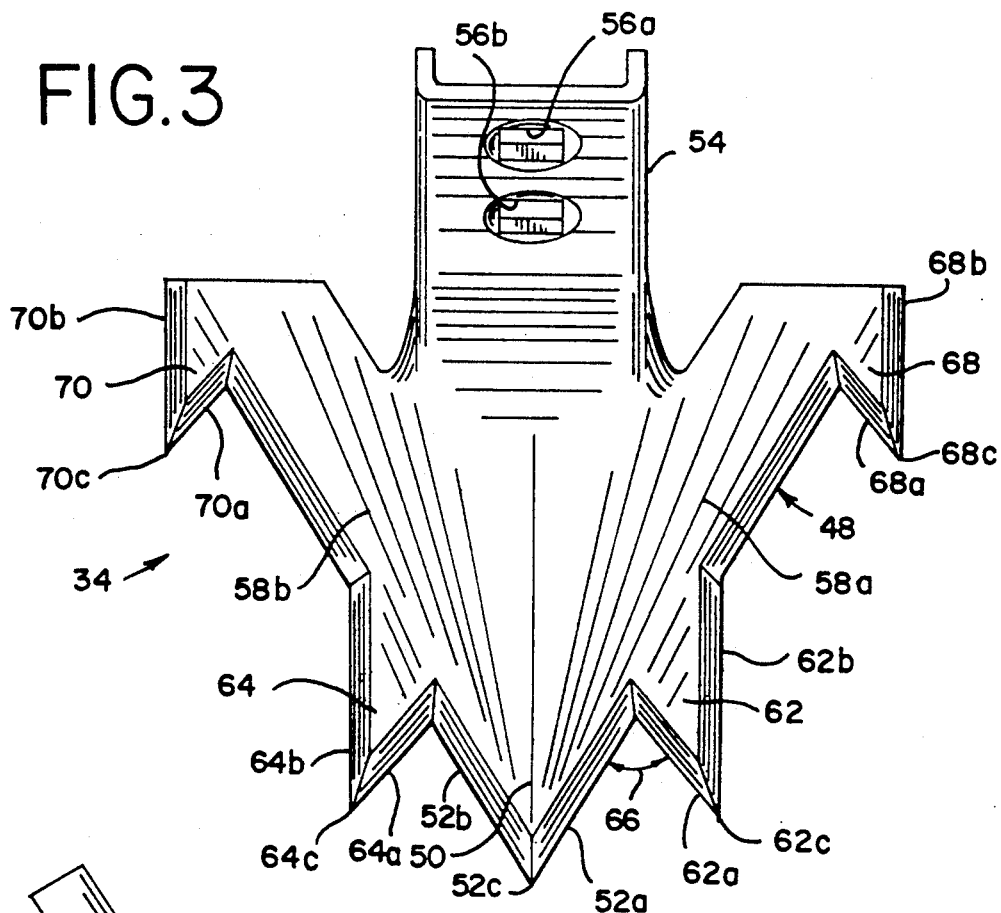
FIG. 3 is a plan view of the center sweep of FIG. 2.

Referring now to the drawings, and in particularly to FIG. 1, a fragmentary portion of a cultivator having a sweep constructed in accordance with known prior art is indicated generally at 10. The cultivator 10 includes a sweep or shovel 12 which is supported on a transverse support beam 14 of the cultivator through a conventional shank on tine 16 and an association trip mechanism 18 of known design. The transverse support beam 14 is adapted for connection to a draft vehicle such as a tractor or the like to facilitate pulling or drawing the sweep 12 through the soil.

The sweep 12 is disclosed in greater detail in U.S. Pat. No. 4,583,599, and has a generally arrowhead shaped body 20 defining a forward point 20a and rearwardly diverging lateral side edges 20b and 20c. The lateral side edges 20b and 20c are preferably sharpened to assist in working the soil and in cutting sub-surface weed stalks and the like as the sweep is drawn or pulled through the soil in the direction of the forward point 20a. An upper surface 22 of the sweep body 20 is preferably formed as an upwardly convex surface having substantially symmetrical surface areas 22a and 22b which slope downwardly from a longitudinal centerline as indicated at 24.

The sweep body 20 may be formed as a unitary body having an upwardly and rearwardly inclined flange 26 in which one or more openings or bolt holes are formed, such as indicated at 26a and 26b, to facilitate attachment of the sweep 12 to the support shank or tine 16. The rearwardly diverging cutting edges 20b and 20c intersect corresponding laterally outwardly extending wing portions 28 and 30 formed integral on the sweep body 20 and which have forward cutting edges 28a and 30a, respectively, disposed at right angles to the longitudinal centerline 24 of the sweep body. The wing portions 28 and 30 have rear edges 28b and 30b, respectively, which are curved upwardly to lie in a plane spaced above the plane of the cutting edges 20b and 20c. The right-angle cutting edges 28a and 30a are intended to cut weeds which tend to run back along the cutting edges 20b and 20c without being severed.

Turning now to the present invention, FIG. 2 illustrates a fragmentary portion of a cultivator, indicated generally at 32, having three cultivator sweeps or shovels in the form of a center sweep 34 and a pair of side or lateral half-sweeps 36 and 38 constructed in accordance with the present invention. The cultivator 32 has a support frame which includes a transverse beam 40 adapted to be mounted or hitched to the rear of a draft vehicle such as a tractor or the like. In the illustrated embodiment, the support beam 40 has three generally C-shaped support shanks or tines 42a, 42b and 42c mounted thereon in equally spaced relation along the support beam through trip mechanisms 44a, 44b and 44c, respectively, of conventional design. The shank 42a extends rearwardly from the support beam 40a distance greater than the shanks 42b and 42c and supports the center cultivator sweep 34 at its lower free end. The shanks 42b and 42c support the outer cultivator sweeps 36 and 38 at their lower free ends. The shanks 42a-c are configured such that the corresponding sweeps 34, 36 and 38 lie in a substantially horizontal plane with the width of the soil path broken up by each of the outer sweeps 36 and 38 being partially overlapped by the width of the center sweep 34 when the cultivator is in an operating position being drawn or pulled by a tractor or the like with the sweeps disposed a predetermined distance below the upper surface of the soil being cultivated. It will be understood that means (not shown) are preferably provided to selectively raise and lower the transverse support beam 40 or rotate the support beam 40 in a manner to position the sweeps below the soil surface during cultivating and retract or raise the sweeps following cultivating. Also, means may be provided to vary the depth traversed by the center sweep 34 relative to the side sweeps 36 and 38.

Figure 4:
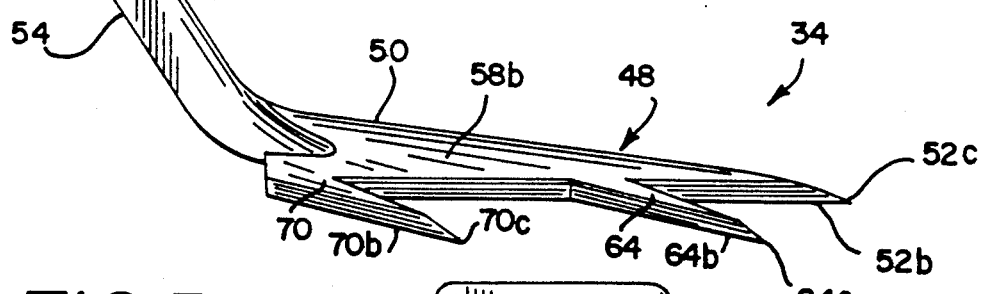
FIG. 4 is a side elevational view of the sweep shown in FIG. 3.
Figure 5:
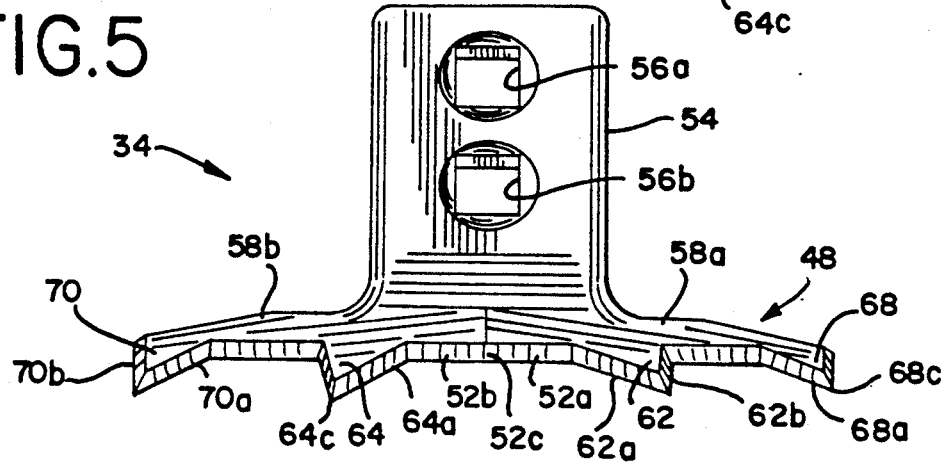
FIG. 5 is a front elevational view of the sweep of FIG. 3.

Referring to FIGS. 3-5, taken in conjunction with FIG. 2, the cultivator sweep 34, which may be used as a single sweep cultivator or in conjunction with the lateral or side sweeps 36 and 38, includes a sweep body 48 which is preferably made of a suitable strength metallic material capable of being formed by a stamping or forging operation. The sweep body 48 is generally of arrowhead shape symmetrical about a longitudinal centerline 50, and has rearwardly diverging primary, cutting edges 52a and 52b which intersect at a forward point 52c. The sweep body 48 has an upwardly inclined central mounting flange 54 having a pair of bolt holes or mounting holes 56a and 56b to facilitate attachment of the sweep 48 to a support shank or tine, such as the shank 42a illustrated in FIG. 2.

The sweep body 48 has an upper substantially convex surface defined by symmetrical surface areas 58a and 58b which intersect along the longitudinal centerline 50. The surface areas 58a,b lie generally in planes which are inclined downwardly at approximately 5°-15° from horizontal, both in a forward downwardly inclined orientation as viewed in FIG. 4, and in a lateral downwardly inclined orientation from the centerline 50 as viewed in FIG. 5. It will be appreciated that the upper surface areas 58a and 58b of the sweep body 48 need not be planar but may have a slight upwardly convex curvature as they slope laterally downwardly from the centerline 50. The rearwardly diverging primary cutting edges 52a and 52b are substantially straight and are preferably sharpened to better break up the soil and effect severing of weed growth in the path of the sweep during cultivation. The upper convex curvature of the sweep body 48 assists in breaking up the soil by creating an upward heaving action in the soil during cultivating.

In accordance with the present invention, the cultivator sweep 34 is provided with at least one, and preferably a plurality of weed cutting points which project generally forwardly and outwardly from the primary cutting edges 52a,b to prevent weeds in the path of the sweep from slipping past the primary cutting edges 52a,b without being severed. In the embodiment illustrated in FIGS. 3-5, the sweep 48 has a first pair of forwardly projecting metallic weed cutting points 62 and 64 which are formed along the primary cutting edges 52a and 52b, respectively, rearwardly from the forward point 52c of the sweep body 48. The weed cutting points 62 and 64 are substantially equal in size and symmetrical relative to the longitudinal centerline 50. The weed cutting points 62 and 64 may be formed integral with or otherwise suitably secured to the sweep body 48 and are preferably formed in substantially coplanar relation with the corresponding upper surface areas 58a and 58b. In this manner, the weed cutting points 62 and 64 project forwardly and outwardly from the respective sweep cutting edges 52a and 52b.

The weed cutting point 62 has an angularly outwardly and forwardly projecting sharpened cutting edge 62a which preferably forms an included acute angle with the associated cutting edge 52a, such as indicated at 66. If desired, the cutting edge 62a may be formed at right angles to the primary cutting edge 52a. The cutting point 62 has an outer sharpened cutting edge 62b which extends substantially parallel to the longitudinal centerline 50 of the sweep body 48 and intersects the angled cutting edge 62a at a point 62c.

The weed cutting point 64 is similarly configured to the cutting point 62 and has a forwardly and outwardly angled sharpened cutting edge 64a forming an included acute angle with the corresponding primary cutting edge 52b. The weed cutting point 64 similarly has a lateral or outer sharpened cutting edge 64b which extends substantially parallel to the longitudinal centerline 50 and intersects the cutting edge 64a at a point 64c.

The cultivator sweep 34 has a second pair of forwardly and outwardly projecting metallic weed cutting points 68 and 70 which are similar to the weed cutting points 62 and 64 and are formed at the rearward ends of the primary cutting edges 52a and 52b. The weed cutting points 68 and 70 are also formed integral with or otherwise suitably secured to the sweep body 48 so as to lie in substantially coplanar relation with the corresponding upper surface areas 58a and 58b on the sweep body. The weed cutting points 68 and 70 are substantially identical to each other in size and are symmetrical about the longitudinal centerline 50 of the sweep body 48 in similar fashion to the weed cutting points 62 and 64. The weed cutting point 68 has a sharpened cutting edge 68a which extends outwardly and forwardly from the primary cutting edge 52a and preferably forms an included acute angle with the adjacent cutting edge 52a. The weed cutting point 68 similarly has an outer or lateral sharpened cutting edge 68b which extends substantially parallel to the longitudinal centerline 50 of the sweep body 48 and intersects the cutting edge 68a at a point 68c.

Similarly, the weed cutting point 70 has an outwardly and forwardly projecting sharpened cutting edge 70a which forms an included acute angle with the corresponding primary cutting edge 52b. The weed cutting point 70 also has an outer sharpened cutting edge 70b which lies parallel to the longitudinal centerline 50 and intersects the cutting edge 70a at a point 70c.

The outwardly and forwardly projecting weed cutting points 62, 64, 68 and 70 on the cultivator sweep 34 assist in penetrating hard soil during cultivation and also sever weed growth in the path of the sweep during cultivation. The forwardly angled sharpened cutting edges 62a, 64a, 68a and 70a capture and sever weed growth between the respective weed cutting points and the corresponding primary cutting edges 52a and 52b on the sweep body 48 to prevent the weed roots or stalks from slipping past the sweep as may happen with known sweeps of the type illustrated in FIG. In addition, the forwardly projecting weed cutting points 62, 64, 68 and 70, and particularly the rear pair of points 68 and 70, resist any tendency of the sweep to ride up out of hard soil during cultivating, thereby better maintaining the sweep below the soil surface with enhanced cultivation and weed removal.

The provision of more than one outwardly and forwardly projecting weed cutting points along each primary cutting edge 52a and 52b on the cultivator sweep 34, as illustrated in FIGS. 3-5, applies primarily to larger size sweeps. Smaller size cultivator sweeps may have only a single weed cutting point formed along each rearwardly diverging primary cutting edge of the sweep. In the latter case, the weed cutting points are preferably formed generally adjacent the rearward ends of the diverging primary cutting edges such as the illustrated weed cutting points 68 and 70. Further, sweeps comprising the forward pair of weed cutting points may be of different size than the sweeps of the rear pair.

Referring again to FIG. 2, the outer cultivator sweeps 36 and 38, which may in the illustrated embodiment be termed in the right-hand and left-hand sweeps, respectively, comprise what are generally termed half-sweeps. The cultivator sweeps 36 and 38 and their respective support shanks or tines 42b and 42c along with the associated trip mechanisms 44b and 44c, are positioned along the length of the cultivator support beam 40 such that the width of the soil path broken up by each of the side cultivator sweeps 36 and 38 partially overlaps the width of the soil path cultivated by the center sweep 34. The cultivator sweeps are sized to effect such overlapping and to effect an overall cultivated width from the outer edge of sweep 36 to the outer edge of sweep 38 substantially equal to the distance or width of soil between two parallel rows of crops which is to be cultivated.

The side cultivator sweeps 36 and 38 are generally similar in construction to the aforedescribed cultivator sweep 34 except that approximately one half of the outwardly facing side of each of the cultivator sweeps 36 and 38 is removed to create a marginal edge, such as indicated at 76 and 78 on the sweeps 36 and 38, respectively, which is parallel to the longitudinal center of the corresponding sweep and traverses the soil in relatively close relation to the corresponding crop row. Each of the cultivator sweeps 36 and 38 has a plurality of outwardly and forwardly projecting weed cutting points formed thereon, such as along its rearwardly diverging primary cutting edges. In the illustrated half-sweeps the rear weed cutting point corresponding to the outer side of each sweep is eliminated leaving a pair of front weed cutting points and a single rear weed cutting point on the inner side of the sweep.

Having thus described preferred embodiments of cultivator sweeps in accordance with the present invention, it will be appreciated that the provision of weed cutting points such as provided on the aforedescribed cultivator sweeps 34, 36 and 38 may be formed on sweeps used on row crop cultivators, field cultivators and danish "S" tine cultivators.

While preferred embodiments of the present invention have been illustrated and described, it will be understood that changes and modifications may be made therein without departing from the invention in its broader aspects. Various features of the invention are defined in the following claims.

What is claimed is:

1. A round working cultivator comprising, in combination, a support beam, at least one support shank mounted generally adjacent one end to said support beam and having opposite free end, and a ground working cultivator sweep secured to the free end of said shank, said sweep including a metallic body having a generally arrowhead shaped configuration substantially symmetrical about a longitudinal centerline to the sweep and defining a generally pointed forward end and rearwardly diverging primary cutting edges for breaking up the soil as the sweep is drawn through the soil, said body having at least one generally coplanar weed cutting point projecting outwardly and forwardly from each of said primary cutting edges so as to to prevent weeds from slipping past the corresponding primary cutting edge, each of said weed cutting points having a sharpened inner cutting edge forming an included acute angle with the corresponding primary cutting edge, and a sharpened outer cutting edge disposed parallel to the longitudinal centerline of the sweep body.

2. A cultivator as defined in claim 1 wherein said weed cutting points are formed integral with the said body.

3. a cultivator as defined in claim 1 wherein said body and weed cutting points are metallic.

4. A cultivator as defined in claim 1 wherein said body has an upwardly facing generally convex surface, said weed cutting points being formed in generally coplanar relation with said upwardly facing convex surface.

5. A cultivator as defined in claim 1 including a plurality of said weed cutting points projecting outwardly and forwardly from each of said primary cutting edges.

6. A cultivator as defined in claim 1 including at least three support shanks mounted in spaced relation on said beam so as to define a center support shank and two outer support shanks, said center shank having said ground working cultivator sweep secured thereto, and each of said outer shank having a half-sweep secured thereto, each of said half-sweeps defining a longitudinal axis and having a first rearwardly extending primary cutting edge diverging outwardly from a pointed forward end of the corresponding half-sweep on the side facing said center shank supported cultivator sweep, said half-sweeps each having a second rearwardly extending cutting edge diverging outwardly from its pointed en on the side opposite said first cutting edge but extending substantially less than the longitudinal length of the half-sweep and terminating in a marginal edge disposed parallel to the longitudinal axis of the half-sweep, each of said half-sweeps having at least one weed cutting point projecting outwardly and forwardly from its primary cutting edges, said cutting points each having a sharpened inner cutting edge forming an included acute angle with the corresponding primary cutting edge and having a sharpened outer cutting edge disposed parallel to the longitudinal axis to the half-sweep.

7. A ground working sweep comprising a generally rigid arrowhead shaped body substantially symmetrical about a longitudinal axis to the sweep and having means for attaching the sweep to a support in, said body having a generally pointed forward end and rearwardly diverging sharpened primary cutting edges, and at least one generally coplanar weed cutting point projecting outwardly and forwardly from each of said primary cutting edges so as to lie in generally symmetrical relation to the longitudinal axis of the sweep, each of said cutting points having a sharpened inner cutting edge forming an included acute angle with the corresponding primary cutting edge, and defining an outer sharpened cutting edge disposed parallel to the longitudinal centerline of the sweep body.

8. A ground working sweep as defined in claim 7 wherein said weed cutting points are formed integral with said body.

9. A ground working sweep as defined in claim 8 wherein said body and weed cutting points are metallic.

10. A ground working sweep as defined in claim 7 wherein said body has an upwardly facing generally convex surface, said weed cutting points being formed in generally coplanar relation with said upwardly facing convex surface.

11. A ground working sweep as defined in claim 7 including a plurality of said weed cutting points projecting outwardly and forwardly from each of said primary cutting edges.

12. A ground working sweep as defined in claim 11 wherein said weed cutting points comprise a first pair of weed cutting points disposed slightly rearwardly from said pointed end of said body, and a second pair of weed cutting points disposed adjacent the rearward ends of the primary cutting edges.

* * * * *

UNITED STATES PATENT AND TRADEMARK OFFICE
CERTIFICATE OF CORRECTION

PATENT NO. : 5,176,209

DATED : January 5, 1993

INVENTOR(S) : Mark VandenBrink

It is certified that error appears in the above-identified patent and that said Letters Patent is hereby corrected as shown below:

```
Column 3, line 25, "40a" should read --40 a--;
Column 3, line 54, delete "the comma after "primary";
Column 5, line 22, insert --1-- after "FIG.";
Column 6, line 22, change "round" to --ground--;

Column 6, line 29, change "to" to --of--;
Column 6, line 45, change "a" to --A--;
Column 6, line 68, change "en" to --end--;
Column 7, line 15, change "in" to --tine--.
```

Signed and Sealed this

Twelfth Day of April, 1994

*Attest:*

BRUCE LEHMAN

*Attesting Officer*

Commissioner of Patents and Trademarks